(12) United States Patent
Basore

(10) Patent No.: US 6,202,481 B1
(45) Date of Patent: Mar. 20, 2001

(54) FUEL LINE PRESSURE TESTING ACCESS DEVICE

(76) Inventor: Walter L. Basore, 5052 Lexington Ave., Jacksonville, FL (US) 32210

(*) Notice: Subject to any disclaimer, the term of this patent is extended or adjusted under 35 U.S.C. 154(b) by 0 days.

(21) Appl. No.: 09/108,642

(22) Filed: Jul. 1, 1998

(51) Int. Cl.[7] .................................................. G01M 15/00
(52) U.S. Cl. ................................................ 73/119 A; 73/756
(58) Field of Search .............................. 73/756, 119 A, 73/117.2, 117.3, 118.1, 118.2

(56) References Cited

U.S. PATENT DOCUMENTS

| 3,650,155 | * | 3/1972 | McJones | 73/116 |
|---|---|---|---|---|
| 5,183,078 | * | 2/1993 | Sorrell | 73/756 |
| 5,357,792 | * | 10/1994 | Getenby | 73/119 A |
| 5,503,683 | * | 4/1996 | Butcher et al. | 134/22.12 |
| 5,605,133 | * | 2/1997 | Tuckey | 123/458 |
| 5,616,837 | * | 4/1997 | Leonard et al. | 73/119 A |
| 5,832,903 | * | 11/1998 | White et al. | 123/514 |

* cited by examiner

Primary Examiner—George Dombroske
(74) Attorney, Agent, or Firm—Thomas C. Saitta

(57) ABSTRACT

A fuel line pressure testing access device having a main body adapted for connection to an outflow fuel line, interchangeable adaptor caps adapted for connection to an inflow fuel line, and a fuel filter, where the main body is provided with a valve port and test valve for connection to a pressure testing apparatus or other testing or servicing equipment.

12 Claims, 3 Drawing Sheets

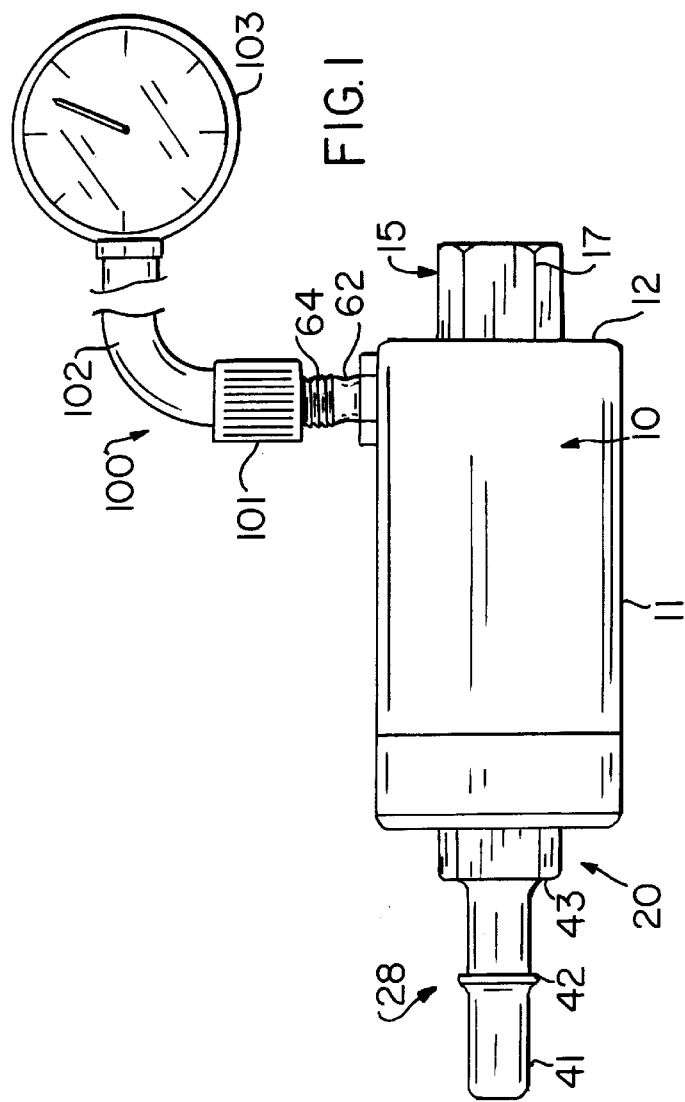
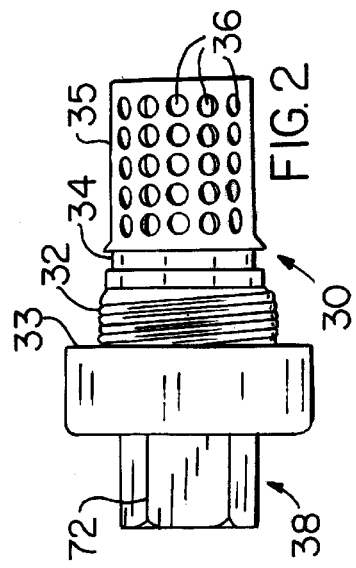

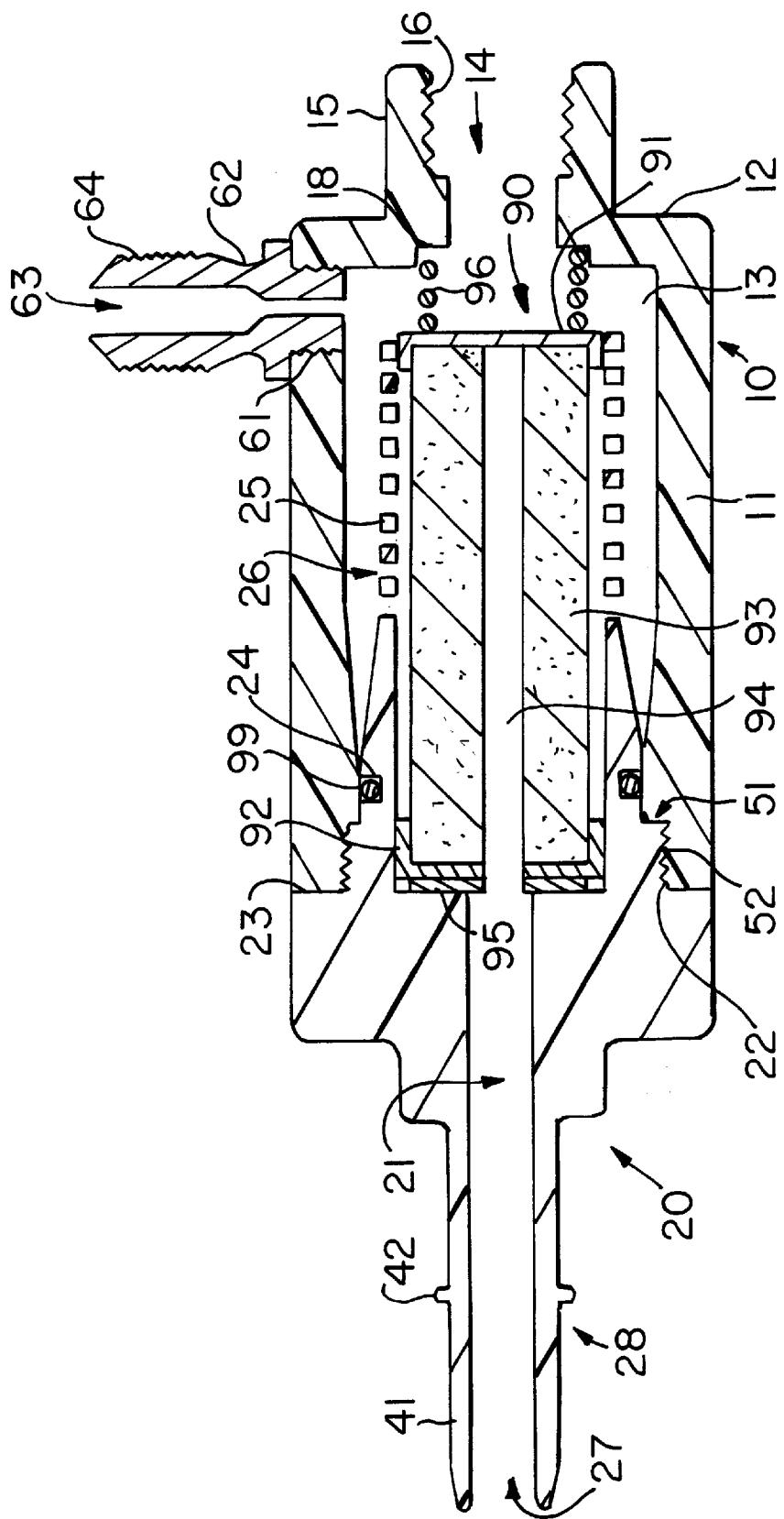

FUEL LINE PRESSURE TESTING ACCESS DEVICE

BACKGROUND OF THE INVENTION

This invention relates generally to the field of equipment used for the diagnostic testing or servicing of fuel lines in automotive engines, and in particular for testing and servicing in fuel injection engines. More particularly, the invention relates to access devices or adaptors which are connected into the fuel line, the access devices allowing pressure gauges or other fuel related testing or servicing equipment to monitor the pressure within the fuel line, to perform other tests, or to introduce servicing gases or fluids into the fuel line. Even more particularly, the invention relates to such devices which are substituted in place of the standard in-line fuel filter.

Diagnostic testing or other servicing of fuel related problems in fuel injection engines often requires that the fuel pressure in the fuel line be checked or other servicing performed while the engine is operating. For fuel pressure testing for example, various hose and gauge assemblies have been developed for this purpose, and typically consist of a short length of flexible conduit hose having connector fittings on each end and a T-shaped connector in the body of the hose, to which is attached a fuel pressure gauge. To use the equipment, one or two fuel lines are disconnected and the connector ends of the testing hose are connected to the fuel lines and/or a component of the engine. The engine is then started and the pressure is monitored on the gauge. Such equipment is well known in the automotive industry, but requires a significant amount of time to accomplish the task of incorporating the test equipment into the fuel line, running the test and then removing the test equipment. An alternative design for an adaptor suitable for pressure testing fuel lines is set forth U.S. Pat. No. 5,357,792 to Getenby. Getenby shows an adaptor which is substituted for the in-line fuel filter itself. The adaptor comprises a flow-through housing with threaded ends to connect to the fuel lines after they are disconnected from the fuel filter. A valve port in the side of the cylinder wall receives a Schrader-type valve, to which a standard pressure testing gauge can be attached. While this device significantly shortens the time required to test fuel pressure in a fuel injection engine, it suffers from several major drawbacks. The primary problem is that the Getenby device is used in place of the fuel filter, and Getenby expressly teaches maintaining an unobstructed conduit through the adaptor. This means that during servicing, which can last many minutes, the fuel flowing to the injectors is not filtered, meaning that significant damage can occur should particulate matter or other impurities, which would normally be filtered out by the in-line filter, reach the injectors. Secondly, the Getenby device makes no provision for alternative types of connector fittings for the inflow fuel line. This is significant in that many automobiles have different connectors on the inflow side of the fuel filter than on the outflow side. Finally, removal of the testing equipment creates hazardous conditions where fuel may leak or spill onto heated engine components or contact electrical systems, exposing the technicians to possible fires or explosions.

It is an object of this invention to provide a fuel line pressure testing access device which enables the fuel pressure to be quickly tested by substituting the access device for the standard in-line fuel filter, where the access device easily connects to the fuel lines removed from the fuel filter, the access device having a valved side port to which a standard pressure gauge is attached. It is a further object to provide such a device where the access device incorporates a fuel filter to protect the engine from damage from impurities in the fuel during testing, and further to provide such a device where one end of the device is interchangeable such that ends with alternative type connector fittings can be joined to the main body of the device to allow connection to inflow fuel lines with various connector types. It is a still further object to provide such a device which can be used with other fuel line testing or servicing operations, including introduction of gases or fluids into the fuel line. These and other objects will be accomplished as described in detail below.

SUMMARY OF THE INVENTION

The invention is a fuel line pressure testing access device for use with automotive engines which allows technicians to measure or monitor the fuel pressure within the fuel line for diagnostic purposes, as well as to provide an access means for other servicing operations such as introduction of gases or fluids into the fuel line, and in particular is an access device which protects the fuel injectors from contaminants during engine operation by filtering the fuel. The access device comprises in general a hollow, cylindrical main body having an outflow end with an internally threaded connector to receive an externally threaded connector fitting on an outflow fuel line, an open end having cap connector means to receive an adaptor cap, and a valved port or ports for connection to pressure testing equipment, such as a pressure gauge, other testing or servicing equipment, or gas and fluid reservoirs. The access device further comprises multiple interchangeable adaptor caps each of which comprises body connector means to mate with the connector means of the main body, means to retain a fuel filter, and a fuel line connector means for joining the device to an inflow fuel line, where the fuel line connector means of one adaptor cap comprises an internally threaded connector and where the fuel line connector means of another adaptor cap comprises a quick connect snap fitting having an elongated tube with an annular bead. The access device further comprises a flow-through fuel filter.

BRIEF DESCRIPTION OF THE DRAWINGS

FIG. 1 is an external view of the invention shown with an adaptor cap having a quick connect fuel line connector means and with a pressure gauge connected to the valved port of the main body.

FIG. 2 is an external view of an alternative adaptor cap having a threaded fuel line connector means, shown removed from the main body.

FIG. 3 is a cross-sectional view taken along line III—III of FIG. 1.

DETAILED DESCRIPTION OF THE INVENTION

Figure 4:
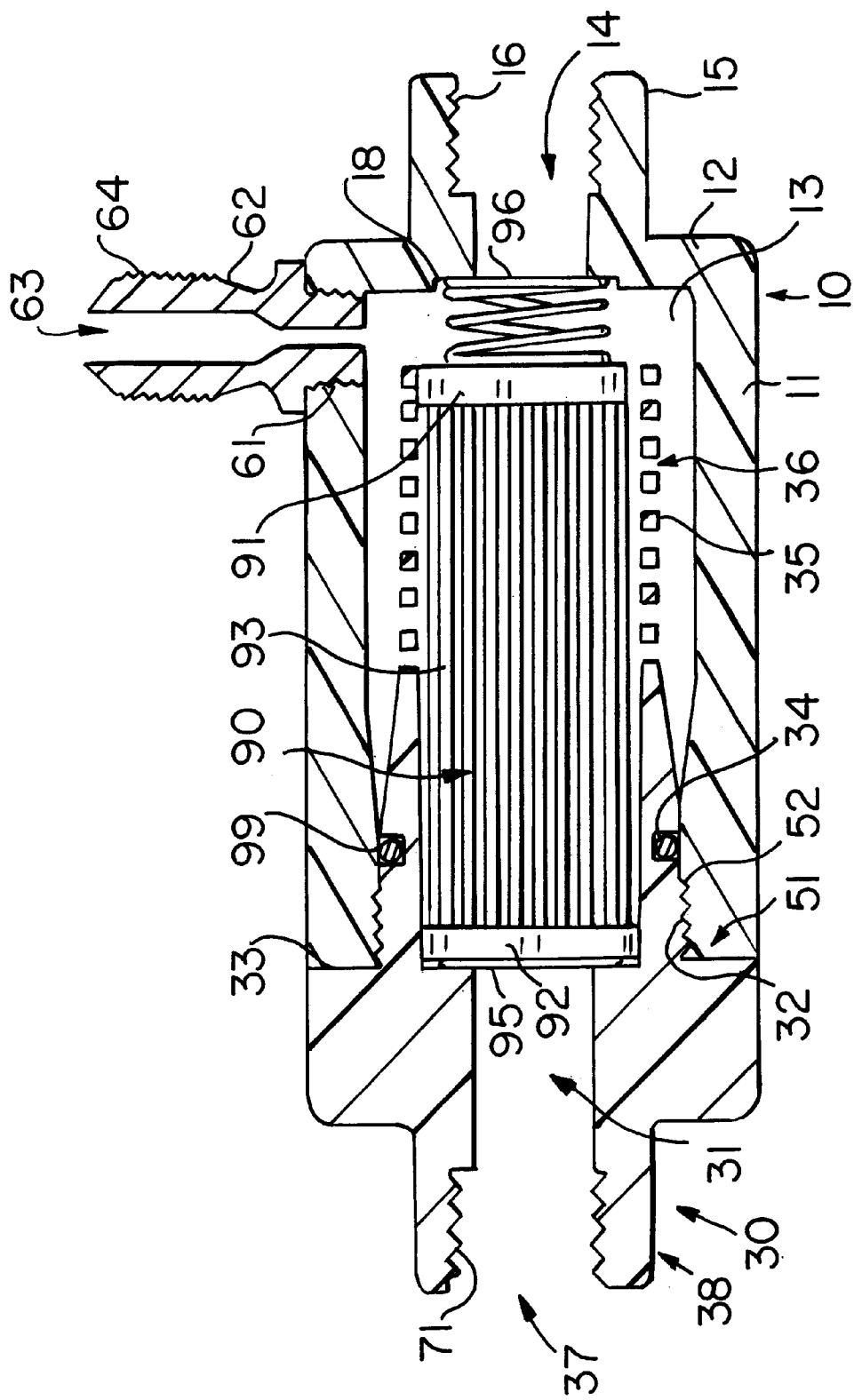
FIG. 4 is a cross-sectional view similar to FIG. 3 with the alternative adaptor cap of FIG. 2 joined to the main body, and the filter and spring shown as exposed.

With reference to the drawings, the invention will now be set forth with regard for the best mode and the preferred embodiment. In general, the invention is an easily installed, fuel line pressure testing access device which is substituted for the standard equipment in-line fuel filter on automotive engines, and especially fuel injection engines, and which allows the fuel pressure within the fuel line to be measured and monitored for diagnostic testing purposes, allows for communication with other testing or servicing equipment, or allows for communication with gas or fluid reservoirs for introduction of such into the fuel line, while the engine is in operation or shut off. The access device preferably has multiple type connector fittings which allows the device to be connected to fuel lines with different connector fittings.

Referring to FIGS. 1 and 3, the access device is shown to comprise a generally elongated, cylindrical housing main body 10 having a cylinder side wall 11 and a partially closed cylinder end wall 11 which together define an open interior area 13. A fuel outflow conduit 14 15 is provided in the cylinder end wall 11 and through fuel line outflow connector means 15 which is shown to comprise a connector fitting having internal threading 16 and wrenching means 17, comprising for example a polygonal shaped exterior or an exterior with two opposing flat sides which provides a surface to be gripped by an open-ended or crescent wrench. The outflow connector means 15 is adapted to correspond with an externally threaded connector fitting on the outflow fuel line (not shown) which conveys the fuel to the engine. The other end of the main body 10 is a generally flat open end 51 which comprises cap connector means 52, which as shown comprises an internally threaded bore, the open end 51 being configured to mate with an adaptor cap 20 in a sealed manner such that no fuel can escape through the joint between the main body 10 and the adaptor cap 20.

A valve port 61 is provided in the main body 10, preferably in the cylinder wall 11 for easier access. A test valve 62, which prevents flow through the valve port 61 when in the closed state and which is the means to connect a pressure testing apparatus 100 or other testing or servicing equipment, is mounted within valve port 61. The test valve 62 has an internal conduit 63 and external threading for joining the pressure gauge apparatus 100 or other equipment, and may comprise a standard Schrader valve which is threaded into the valve port 61. The internal core of the Schrader valve is not shown in FIG. 3 for clarity. The pressure testing apparatus 100 may comprise any suitable equipment for measuring or monitoring the fuel pressure within the access device, and may simply comprise a pressure gauge 103 connected by a flexible hose 102 to a fitting 101 joined to the external threading 64 of the test valve 62. It is preferable that: the pressure testing apparatus 100 be disconnectable from the test valve 62, since this enables the access device to be installed in a vehicle for long term use in place of the standard fuel filter if desired. For such usage, a threaded cap is preferably provided to block debris from interfering, with the functioning of the test valve 62. It is also possible to provide multiple valve ports 61 and test valves 62 in a single body 10.

The interior 13 of the main body 10 is sized to receive and enclose a flow-through fuel filter 90 of standard type and function. The cylindrical fuel filter 90 comprises a pleated filter medium 93 bounded on one side with a closed end cap 91 and on the other side with an apertured end cap 92, the filter 90 having a hollow core 94. An apertured gasket 95 of rubber or polymer material is positioned on the apertured end cap 92 to seal against the adaptor cap 20. In the usual manner, this construction allows fuel to pass through the apertured end cap 91 into the core 94, through the pleated filter medium 93 into the interior 13 of main body 10 and out the outflow conduit 14. A spring member 96 is positioned between the closed end cap 91 and the interior of the cylinder end 12, the spring 96 being seated in a spring recess 18 in the cylinder end 12. The spring 96 biases the filter 90 toward the adaptor cap 20 to maintain the gasket 95 firmly in place so that all fuel flows through the filter 90.

The other main component of the access device is an adaptor cap shown in FIGS. 1 and 3 as a first adaptor cap 20. The adaptor cap 20 connects to the inflow fuel line (not shown) which delivers fuel from the fuel pump. The first adaptor cap 20 has an internal conduit 21 body connector means 22, which as shown comprise an externally threaded cylinder which mates with the internally threaded bore of the cap connector means 52 of the main body 10, such that the open end 51 of the main body 10 abuts a mating shoulder 23 on the first adaptor cap 20. Disposed to the interior of the body connector means 22 is an O-ring receiving channel 24 which retains an O-ring 99 in a position which contacts the interior of the cylinder wall 11 of the main body to preclude escape of fuel from the interior of the access device through the joint between the adaptor cap 20 and the main body 10. First adaptor cap 20 further comprises a filter cage 25, an open ended housing sized to receive and retain the cylindrical fuel filter 90 in proper position. The filter cage 25 is provided with flow apertures 26 to allow fuel to flow from the pleated filter medium 93 into the open interior 13 of the main body 10. The exposed end of the first adaptor cap 20 comprises a fuel flow conduit 27 and fuel line inflow connector means 28 to join the access device to a quick connect snap fitting on the inflow fuel line (not shown). The inflow connector means 28 comprises an elongated tube 41 having an annular bead 42 and wrenching means 43 to enable use of a wrench in tightening the adaptor cap 20 onto the main body 10.

In circumstances where the inflow fuel line has an externally threaded connector fitting of the type found on the outflow fuel line, the first adaptor cap 20 is replaced by the second adaptor cap 30, as shown in FIGS. 2 and 4. The interior elements of second adaptor cap 30 correspond to the interior elements of the first adaptor cap 20, there being provided an internal conduit 31, body connector means 32 comprising an externally threaded cylinder which mates with the cap connector means 52 of the main body 10, a mating shoulder 33 to abut the open end 51 of the main body 10, an O-ring channel 34, and a filter cage 35 with flow apertures 36. The external elements comprise a fuel inflow conduit 37 and fuel line inflow connector means 38, which here comprise internal threading 71 to receive the fuel line inflow connector and wrenching means 72 for tightening the adaptor cap 30 onto the main body 10.

To use the access device, the fuel inflow and outflow lines are disconnected from the standard fuel filter, which may be completely removed from the vehicle and replaced if desired. The proper adaptor cap 20 or 30 is chosen and mated with the main body 10. The inflow fluid line is connected to the inflow connector means 28 or 38 and the outflow fluid line is connected to outflow connector means 15 of the main body 10. The pressure testing apparatus 100 or other testing or servicing equipment is then connected to the test valve 62, which opens conduit 63. With the engine running, the fuel line pressure can now by checked with the filter 90 in place to block impurities from passing into the fuel injectors.

It is understood that equivalents and substitutions for certain elements set forth above may be obvious to those skilled in the art, and the true scope and definition of the invention therefore is to be as set forth in the following claims.

I claim:

1. A fuel line access device comprising a main body having fuel line outflow connector means to join said main body to a fuel outflow line, a fuel outlet conduit, an open interior, a valve port, a test valve mounted in said valve port for connection to a testing or servicing apparatus, fuel line inflow connector means to join said main body to a fuel inflow line, an internal conduit, and a fuel filter disposed within said main body.

2. The device of claim 1, where said test valve comprises a Schrader valve.

3. A fuel line access device comprising:

(A) a main body having fuel line outflow connector means to join said main body to a fuel outflow line, a fuel outlet conduit, an open interior, an open end with cap connector means to matingly join an adaptor cap, a valve port and a test valve mounted within said valve port for connection to a testing or servicing apparatus;

(B) an adaptor cap joined to said main body and having fuel line inflow connector means to join said adaptor cap to a fuel inflow line, an internal conduit, body connector means to matingly join said adaptor cap to said main body; and (C) a fuel filter disposed within said main body, whereby fuel entering said adaptor cap passes through said fuel filter into said open interior and through said fuel outlet conduit.

4. The device of claim 3, where said adaptor cap further comprises a fuel filter cage to receive said fuel filter.

5. The device of claim 3, where said adaptor cap is removable from said main body.

6. The device of claim 3, where said test valve comprises a Schrader valve.

7. The device of claim 3, where said fuel line outflow connector means comprises an internally threaded bore and said fuel line inflow connector means comprises an internally threaded bore.

8. The device of claim 3, where said fuel line outflow connector means comprises an internally threaded bore and said fuel line inflow connector means comprises an annularly beaded tube.

9. A fuel line access device comprising:

(A) a main body having fuel line outflow connector means to join said main body to a fuel outflow line, a fuel outlet conduit, an open interior, an open end with cap connector means to matingly join a first or a second adaptor cap, a valve port and a test valve mounted within said valve port for connection to a testing or servicing apparatus;

(B) a first adaptor cap joinable to said main body and having fuel line inflow connector means to join said adaptor cap to a fuel inflow line, an internal conduit, and body connector means to matingly join said adaptor cap to said main body;

(C) a second adaptor cap joinable to said main body and having fuel line inflow connector means to join said adaptor cap to a fuel inflow line, an internal conduit, and body connector means to matingly join said adaptor cap to said main body, where said second adaptor cap fuel line inflow connector means is different from said first adaptor cap fuel line inflow means;

(D) a fuel filter disposed within said main body, whereby fuel entering said adaptor cap passes through said fuel filter into said open interior and through said fuel outlet conduit;

where either said first adaptor cap or said second adaptor cap is joined to said main body.

10. The device of claim 9, where said first adaptor cap fuel line inflow connector means comprises an internally threaded bore and where said second adaptor cap fuel line inflow connector means comprises an annularly beaded tube.

11. The device of claim 9, where said first and second adaptor cap each further comprises a fuel filter cage to receive said fuel filter.

12. The device of claim 9, where said test valve in said first adaptor cap and said second adaptor comprises a Schrader valve.

* * * * *